United States Patent [19]

Krepela et al.

[11] Patent Number: 4,537,386

[45] Date of Patent: Aug. 27, 1985

[54] ENGINE SHUTDOWN VALVE

[75] Inventors: Josef Krepela; Jaromir Friedrich, both of Edmonton, Canada

[73] Assignee: Bralorne Resources Limited, Canada

[21] Appl. No.: 421,062

[22] Filed: Sep. 22, 1982

[51] Int. Cl.³ .............................................. F16K 1/16
[52] U.S. Cl. .................................... 251/302; 251/66; 251/74
[58] Field of Search ................. 251/66, 178, 302, 303, 251/67, 68, 69, 70, 71, 72, 73, 74, 75; 137/520, 521

[56] References Cited

U.S. PATENT DOCUMENTS

| | | | |
|---|---|---|---|
| 1,587,055 | 6/1926 | Wilson | 251/178 |
| 2,223,292 | 11/1940 | Maxon | 251/70 |
| 2,860,649 | 11/1958 | Billian | 251/302 |
| 2,943,706 | 7/1960 | Morgan | 251/71 |
| 3,082,627 | 3/1963 | Yeo et al. | 251/67 |
| 3,255,772 | 1/1966 | Williams | 251/302 |
| 3,785,615 | 1/1974 | Haven | 251/74 |
| 4,381,100 | 4/1983 | Schoenberg | 251/302 |

FOREIGN PATENT DOCUMENTS 759785  8/1980  U.S.S.R. .............. 251/302

Primary Examiner—Samuel Scott
Assistant Examiner—Noah Kamen
Attorney, Agent, or Firm—John R. Uren

[57] ABSTRACT

An engine shutdown valve comprises a substantially circular gate valve movable about an axis between open and closed positions within a valve housing mounted in an engine induction manifold. A gate lever connects the gate valve with the axis and a movement mechanism acts to move the lever between the two positions. A latching mechanism holds the gate lever and gate valve in the open position and a release mechanism is operable to release the latching mechanism when desired. The latching release and movement mechanisms are all located in a latch housing which is located exterior of the valve housing and manifold.

20 Claims, 9 Drawing Figures

ENGINE SHUTDOWN VALVE

INTRODUCTION

This application relates to an engine shutdown valve and, more particularly, to an engine shutdown valve utilized on an engine induction manifold where space is minimal

BACKGROUND OF THE INVENTION

When using diesel engines, air supply cut off valves are useful if it is desirable to quickly shutdown the engine for safety purposes. Such a condition under which it would be so desirable would be where there exist combustible substances about the engine as may be the case when oil or gas wells are drilled. Further, mechanical malfunctions may cause the engine to overspeed thus creating the potential for economic loss. This is obviously undesirable and engine cut off valves may be used to eliminate the possibility of such loss.

Engine shutdown valves are known. Such an engine shutdown valve is disclosed, for example, in our U.S. Pat. Nos. 4,215,845 and 4,285,495. These devices are satisfactory for the purposes under which they are used but they have the disadvantage in that they are too large for some applications.

SUMMARY OF THE INVENTION

According to the present invention, there is disclosed an engine shutdown device adapted to be inserted in the induction manifold of an engine and comprising a substantially circular gate valve movable within a valve housing about an axis between open and closed positions, a gate lever between said gate valve and said axis, latching means to hold said valve and lever in said open position, release means to release said latching means, and movement means acting on a portion of said gate lever to move said valve and lever between said open and said closed positions, said latching, release and movement means being positioned in a latch housing located exterior of and substantially immediately adjacent to said valve housing and said induction manifold, said latch housing having a generally cylindrical cross-sectional configuration with a diameter generally approximating the width of said shutdown device between its upstream and downstream faces, said gate lever passing through said latch housing, and said gate lever portion being aligned with said release, latching and movement means within said latch housing.

BRIEF DESCRIPTION OF THE SEVERAL VIEWS OF THE DRAWINGS

The invention will now be described, by way of example only, with reference to the accompanying drawings in which.

DESCRIPTION OF SPECIFIC EMBODIMENT

Figure 1:
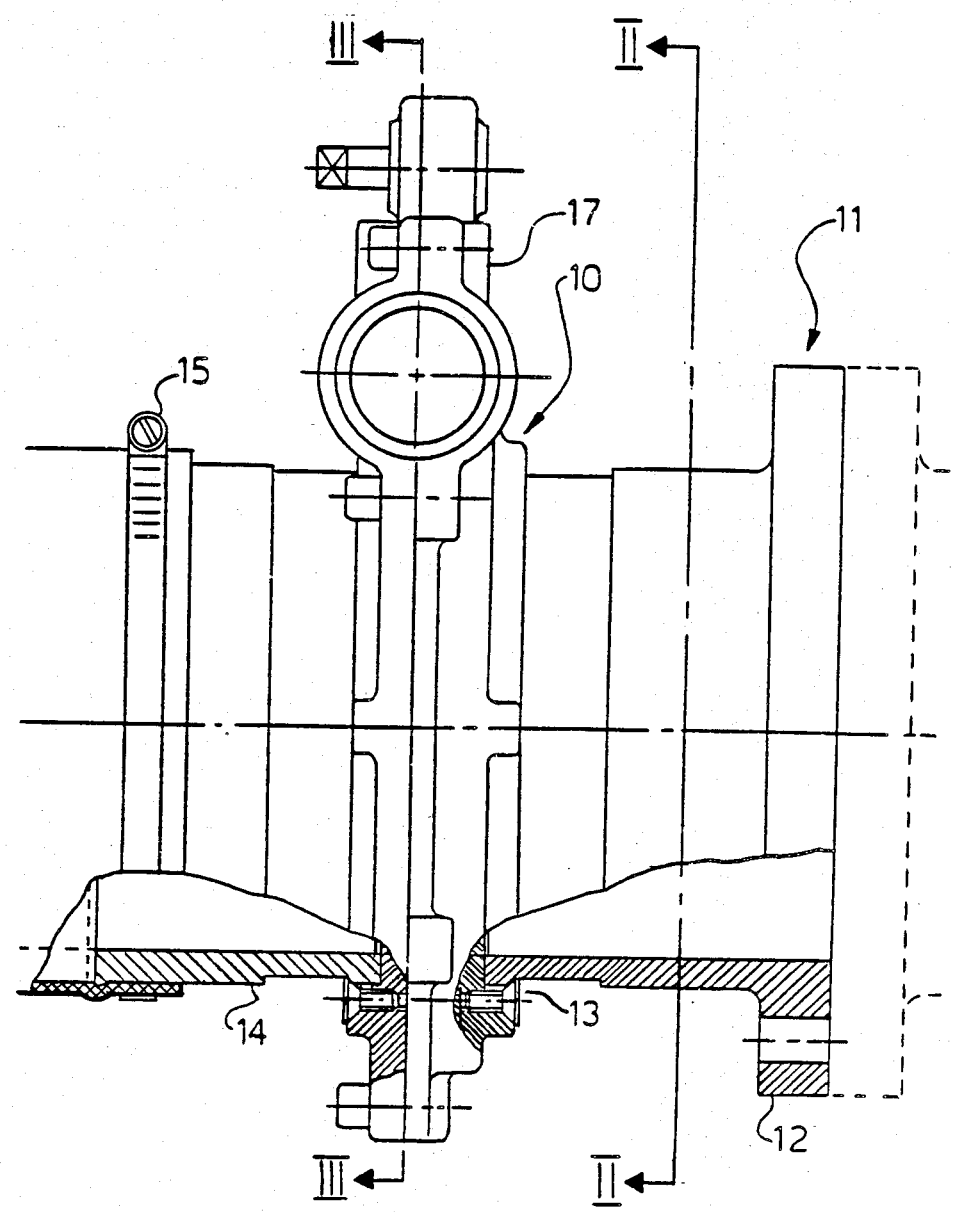
FIG. 1 is a view of a shutdown valve installed on an engine induction manifold.

Referring now to the drawings, an engine shutdown valve is shown generally at 10 in FIG. 1 in its installed position within an engine induction manifold shown generally at 11. The induction manifold includes an area where the shutdown valve 10 is installed. Within this area, a flange connection nozzle 12 is connected on the upstream end to the engine manifold and on the downstream end to shutdown valve 10 by cap screws 13. On the opposite side of the shutdown valve 10, a hose connection nozzle 14 is secured to the shutdown valve by cap screws 13 and is attached to the engine manifold 11 by a clamp 15.

Figure 2:
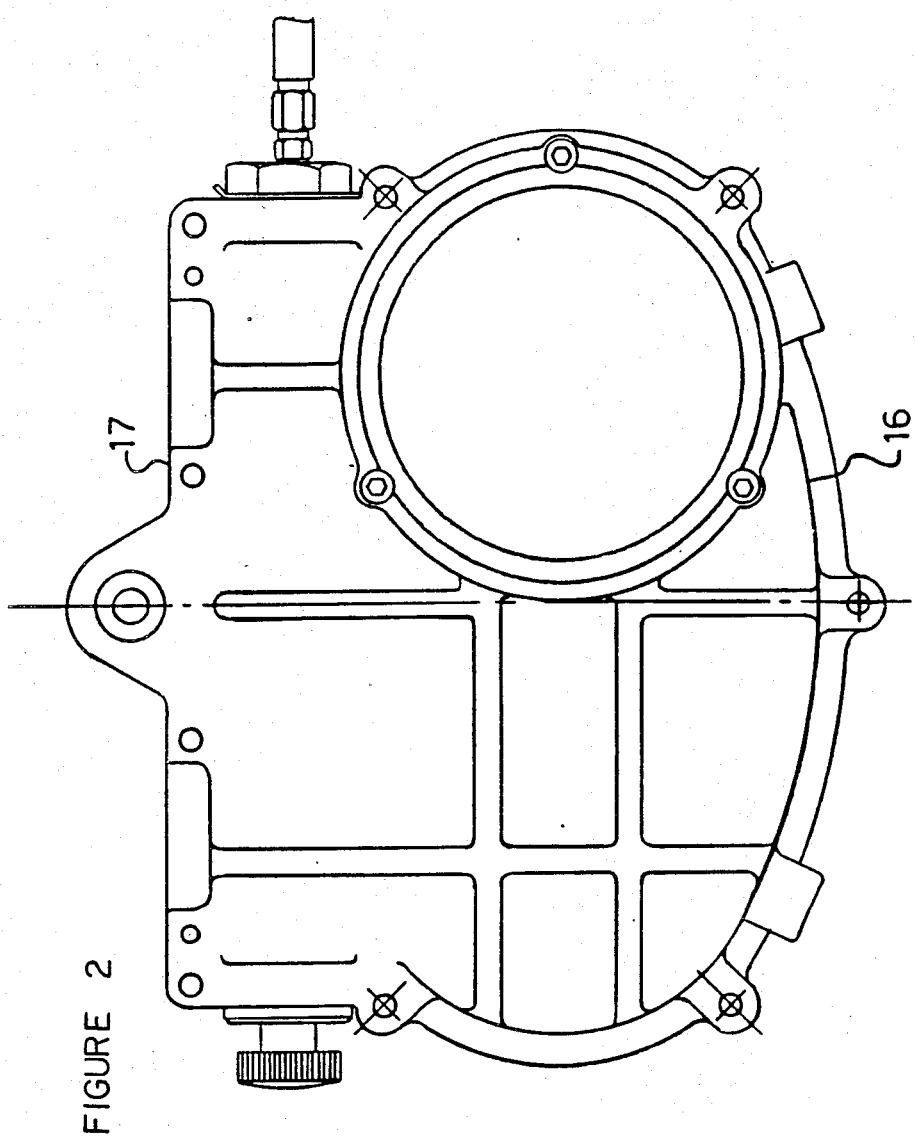
FIG. 2 is a view taken along II—II of FIG. 1.

The engine shutdown valve 10 has a valve housing 16 and a cylindrical latch housing 17 (FIG. 2). The valve and latch housings 16, 17 (FIG. 3) comprise body 18 and body cover 19 held together by cap screws 20. Body 18 has a step portion 21 that defines a recess between body 18 and body cover 19 (FIG. 4). Recessed bores 34, 35 are provided in body cover 18 and body cover 19 for attachment of various nozzle configurations as dictated by the particular induction system requirement.

A pin 22 is positioned adjacent latch housing 17 and gate lever 23 pivots about pin 22 which is sealed with O-rings 24.

Gate lever 23 extends from pin 22 to a gate valve shown generally at 25. Gate valve 25 consists of two gate halves 26, 27 and a gate locating pin 28 which retains the gate lever 23 in the gate valve 25. Gate spreader springs 29 act outwardly on the gate halves 26, 27 and are located around the periphery of the gate valve 25. They act to separate the two gate halves 26, 27 and, therefore, to provide a better seal between urethane gate seals 30 attached to gate halves 26, 27 and the body and body cover 18, 19, respectively.

In the upper portion of the valve housing 16, an opening 31 is provided for movement of the gate lever 23. The cylindrical latch housing 17 is formed above the opening 31. A guide cylinder 33 is inserted within the latch housing 17 and extends throughout its length.

O-rings 38 are positioned at both ends of the guide cylinder 33 and act as seals. At one end of the guide cylinder 33, a lock washer 39 is provided and a threaded plug 40 is inserted into matching threads on the inside of guide cylinder 33. An O-ring 41 seals the plug 40.

A spindle plug 42 at the opposite end of the guide cylinder 33 is inserted into the guide cylinder 33 and retained by adhesive and two plug locking pins 56. These pins 56 also pass through guide cylinder 33 and retain it within the latch housing 17.

Figure 5:
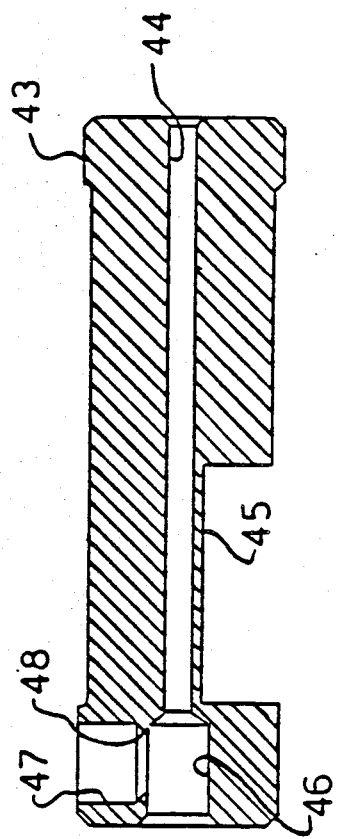
FIG. 5 is an enlarged plan view of the gate lever guide.

A gate lever guide 43 (more clearly shown in FIG. 5) is inserted into guide cylinder 33 and is reciprocal therein. Gate lever guide 43 has a port 44 drilled along its length for purposes which will be apparent hereafter. A recess 45 is machined in gate lever guide 43 to allow the entry and passage of gate lever 23. A second recess 46 is drilled in the end of the gate lever guide 43 along its axis. This second recess 46 is larger than port 44 and is connected thereto. A hole 47 is machined into a portion of gate lever guide 43 normal to its axis and a ball 37 is placed into hole 47. Ball 37 is of a size such that when it is sitting on the countersink portion 48 of diameter 47 it will be wholly within the outside diameter of the gate lever guide 43. When forced out of the countersink portion 48 as depicted in the OPEN position of FIG. 3, it will engage the opening 36 in the guide cylinder 33.

A longitudinal trip spindle 49 passes through spindle plug 42 and extends a distance sufficient to be inserted into recess 46 of gate lever guide 43 when it is in the OPEN position. A spring retainer 50 is mounted on trip spindle 49 and a spindle lock spring 51 extends between spring retainer 50 and the inside of spindle plug 42. A gate actuating spring 52 extends between gate lever guide 43 and spindle plug 42. A groove 53 is machined around trip spindle 49 and an O-ring 54 is positioned within groove 53 and acts as a seal.

A clevis yoke 55 is mounted on the end of trip spindle 49 and a locking pin 56 extends through spindle plug 42. An extension 57 shown in phantom extends from clevis yoke 55 to a pull-knob or lever (not shown) controlled by the operator.

OPERATION

Figure 3:
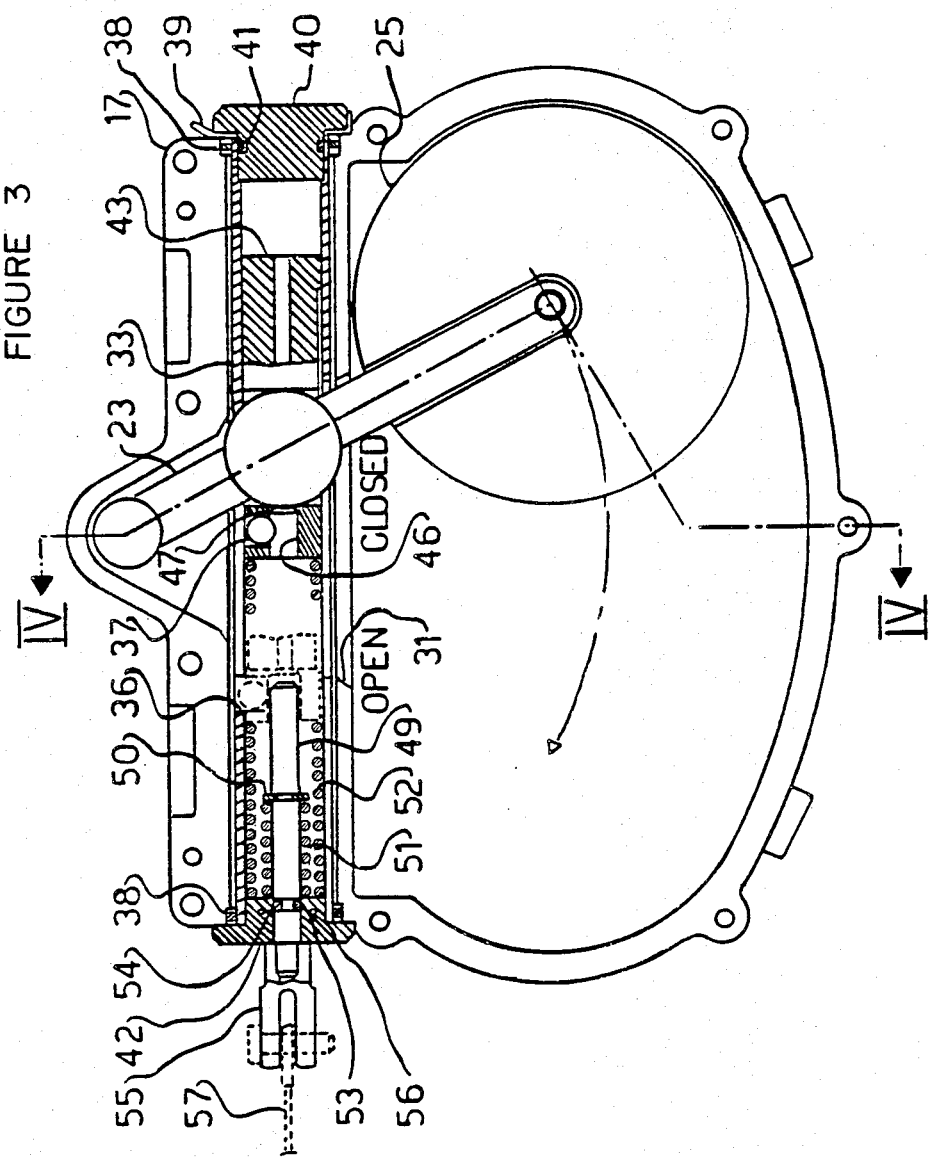
FIG. 3 is a sectional view of the shutdown valve taken along the lines III—III of FIG. 1.
Figure 4:
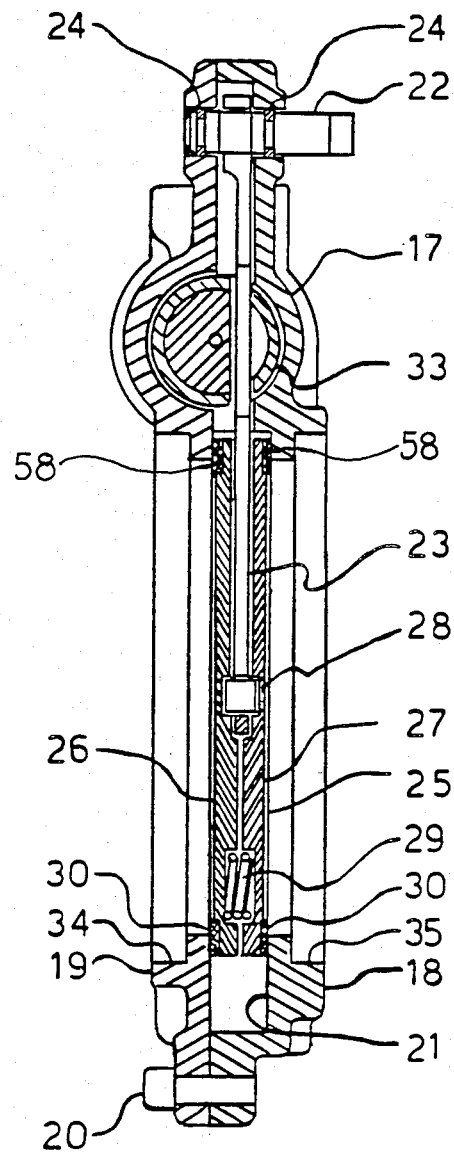
FIG. 4 is a sectional view of the shutdown valve taken along the lines IV—IV of FIG. 3.

In operation, the engine shutdown valve 10 will be assumed to be in the CLOSED position shown in FIG. 3; that is, the gate valve 25 is shown in solid in which position the engine will be shutdown by the gate valve 25 blocking the flow of induction air through the manifold. In this position, the ball 37 will be held by the countersink portion 48 of hole 47 and will be wholly within the inside diameter of gate lever guide 43 so that there will be no engagement with the guide cylinder 33.

A wrench (not shown) is applied to the squared end of pin 22 and the pin is rotated clockwise as seen in FIG. 3. The gate lever 23 and the gate valve 25 rotate clockwise and the gate lever guide 43, being under force from the rounded portion of gate lever guide 43 in recess 45 moves against the action of the gate actuating spring 52 to the left in FIG. 3.

As the gate lever guide 43 moves leftwardly, trip spindle 49 enters recess 46 and forces ball 37 upwardly into the opening 36 in guide cylinder 33. This latches gate lever guide 43 and, accordingly, restrains the movement of gate lever 23 and gate valve 25 in the OPEN position.

If an unsafe condition is present and the operator desires to move the gate valve 25 to the CLOSED position, the operator will manually operate a knob or lever (not shown) attached to extension 57. This will cause the trip spindle 49 to move leftwardly against the action of spindle lock spring 51 and out of second recess 46. As the trip spindle 49 moves out of second recess 46, ball 37 is forced out of opening 36 in guide cylinder 33 by the action of the gate actuating spring 52 and the movement of gate lever guide 43 rightwardly as seen in FIG. 3. Since ball 37 is no longer retaining gate lever guide 43, it will move rightwardly and, therefore, force gate lever 23 and gate valve 25 to the CLOSED position thereby stopping the flow of induction air. Thereafter, the valve 10 may again be reset as described above and the sequence will reoccur.

Gate valve 25 has urethane gate seals 58 mounted on both halves of the gate valve 25. These seals 58 are constantly in contact with the body 18 and body cover 19 of the gate housing 16 and provide a seal when the gate valve 25 is in the CLOSED position. This seal is enhanced by the plurality of gate spreader springs 29 located about the periphery of the gate valve 25 which spreader springs 29 also act to reduce vibration and, therefore, to reduce wear.

Further embodiments of the invention are depicted in FIGS. 6–9, each embodiment utilizing a different type gate valve "trip" or "set" mechanism.

Figure 6:
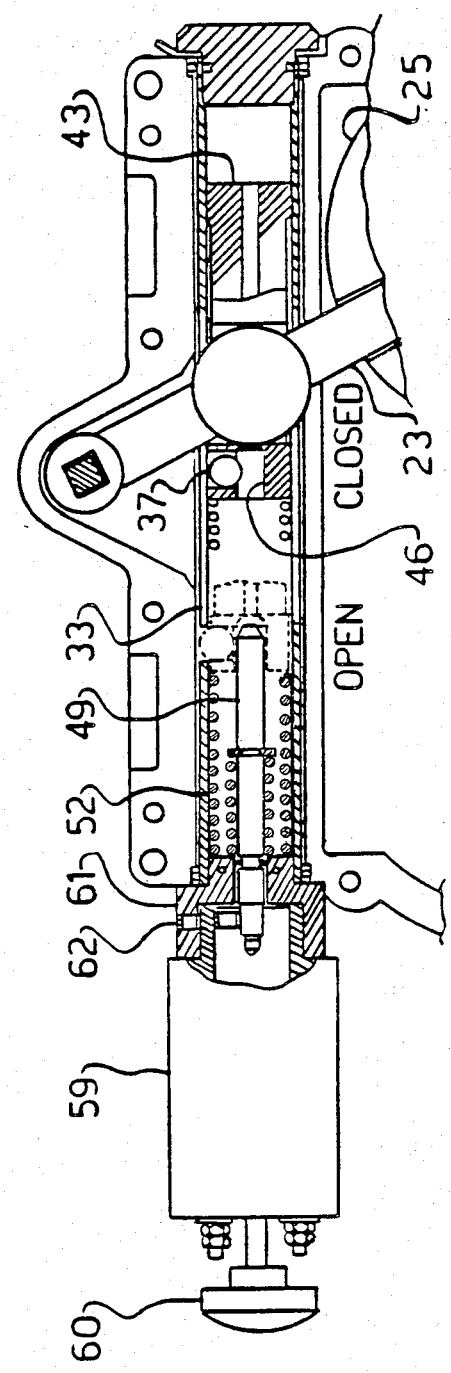
FIGS. 6-9 are views of alternative embodiments of the restraining, release and movement mechanisms of the engine shutdown valve.

Referring to FIG. 6, a solenoid 59 is used to trip the gate lever guide 43 rather than the trip being performed manually. In this embodiment, the gate lever guide 43 is manually moved to the OPEN position as in the embodiment of FIG. 3. Solenoid 59, however, is attached to solenoid adapter 61 by set screws 62. Solenoid adapter 61 takes the place of spindle plug 42 in the FIG. 3 embodiment. A reset knob 60 is pushed into solenoid 59 to ensure spindle 49 protrudes into second recess 46 in gate lever guide 43 when the guide 43 is moved leftwardly to the OPEN position.

When it is desired to trip the gate valve 25 in order to move it to the CLOSED position, solenoid 59 is activated by a suitable D.C. voltage. Trip spindle 49 will retract from recess 46 in gate lever guide 43, ball 37 will be free to move downwardly out of engagement with guide cylinder 33 and the lever guide 43, gate lever 23 and gate valve 25 will be free to move rightwardly under the action of gate actuating spring 52 to the CLOSED position. Thereafter, the reset sequence is as previously described.

Figure 7:
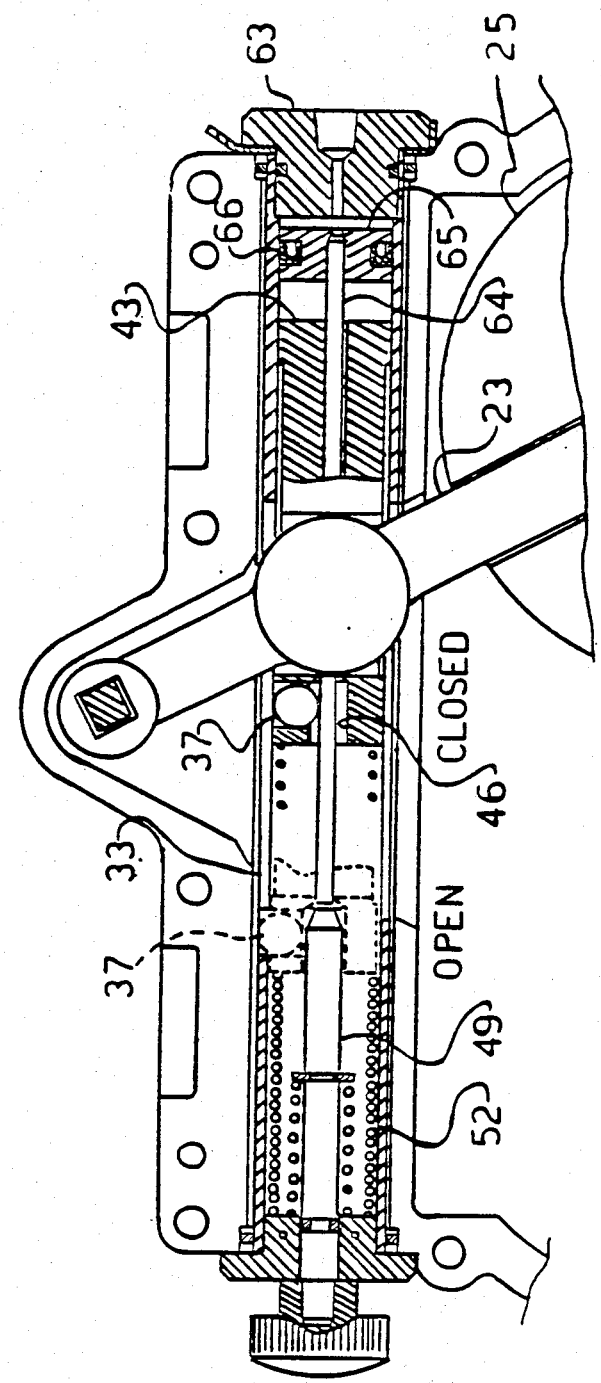

An "air trip" mechanism is used in the embodiment of FIG. 7. In this embodiment, the gate lever guide 43 is manually reset to the OPEN position as in the embodiment of FIG. 3. However, the plug 40 (FIG. 3) is replaced by an air inlet plug 63 and a push rod 64 extends through gate lever guide 43 and is attached to piston 65. Piston 65 includes a U-cup 66 which seals the piston 65.

In operation, when it is desired to trip the gate valve 25 from the OPEN to the CLOSED position, air pressure is provided to air inlet plug 63 which passes therethrough. The air exerts pressure on piston 65 which moves leftwardly together with push rod 64. Push rod 64 will push against the trip spindle 49 thereby moving it out of recess 46. When the trip spindle 49 moves out of recess 46, ball 37 drops downwardly out of engagement with guide cylinder 33 and the lever guide 43, gate lever 23 and gate valve 25 will be free to move rightwardly under the action of gate actuating spring 52 to the CLOSED position.

Figure 8:
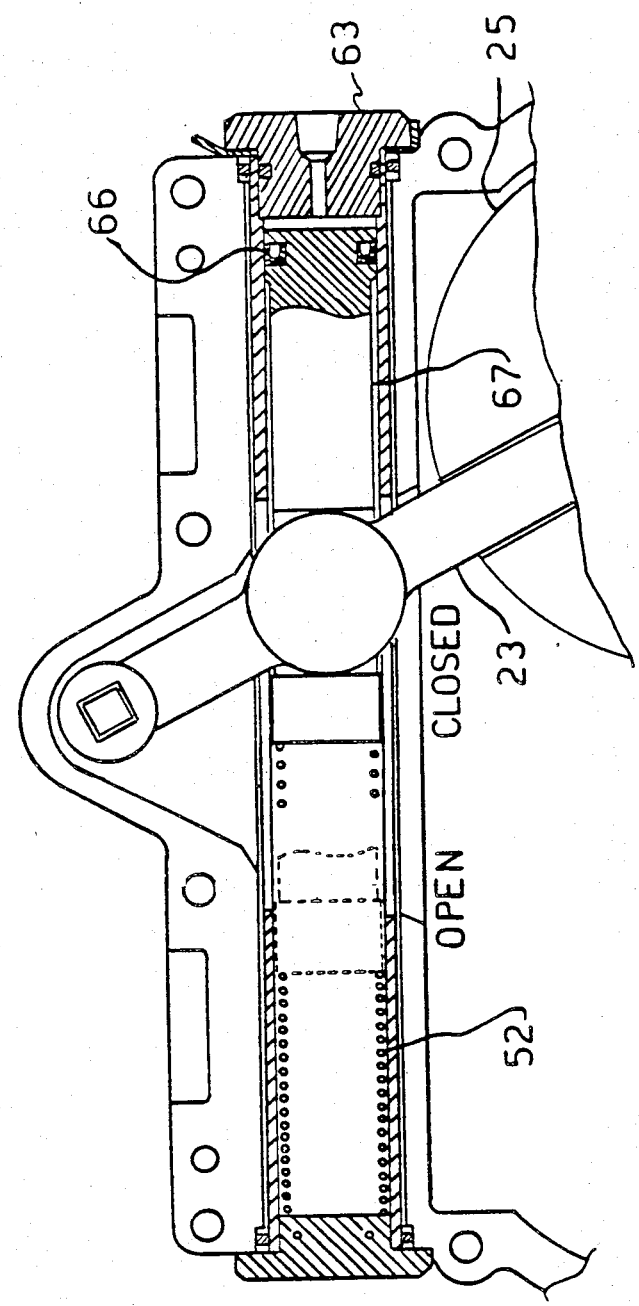

An "air-open" mechanism is depicted in the embodiment of FIG. 8. In this embodiment, no trip spindle 49 is used to latch the gate valve 25 in the OPEN position. Rather, a gate lever guide 67 is used to move the gate valve 25 to the OPEN position. A U-cup 66 seals the gate lever guide 67. Gate actuating spring 52 acts directly on the end of gate lever guide 67.

In operation, when it is desired to move the gate valve 25 to the OPEN position, air pressure is applied to air inlet plug 63. This air pressure causes gate lever guide 67 together with gate lever 23 and gate valve 25 to move leftwardly. When the pressure is discontinued, gate valve 25 will move to the CLOSED position under the influence of gate actuating spring 52. In this embodiment therefore, the air pressure must be maintained if it is desired to keep the gate valve 25 in the OPEN position.

Figure 9:
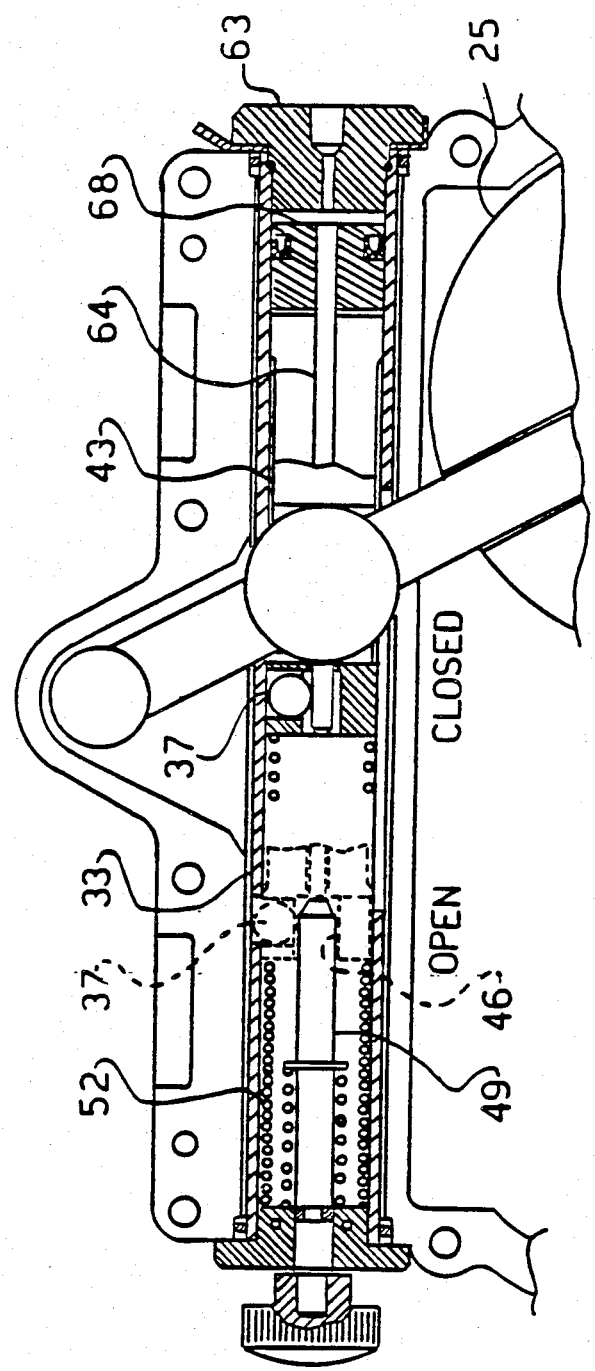

An "auto-set" mechanism is depicted in the embodiment of FIG. 9. In this embodiment, a piston 68 is provided which acts on gate lever guide 43. The gate valve 25 is manually set to the OPEN position as in the embodiment of FIG. 2. Air pressure is then supplied to air inlet plug 63. The air pressure causes piston 68 and push rod 64 to move leftwardly disengaging trip spindle 49 from recess 46 and allowing ball 37 to drop downwardly out of engagement with guide cylinder 33. Piston 68, however, will hold the gate lever guide 43 and, therefore, gate valve 25 in the OPEN position.

In operation, when it is desired to move the gate valve 25 to the CLOSED position, air pressure being supplied to air inlet plug 63 is simply terminated. The termination of the air pressure allows gate lever guide 43 to move rightwardly under the influence of gate actuating spring 52 rightwardly until it reaches the CLOSED position.

There has been described an engine shutdown device and several variations which are illustrative of particular embodiments of the invention and should not be construed as limiting. Other modifications may be made which will still fall within the scope of the invention as defined in the accompanying claims.

I claim:

1. An engine shutdown device adapted to be inserted in the induction manifold of an engine and comprising a substantially circular gate valve movable within a valve housing about an axis between open and closed positions, a gate lever between said gate valve and said axis, latching means to hold said valve and lever in said open position, release means to release said latching means, and movement means acting on a portion of said gate lever to move said valve and lever between said open and said closed positions, said latching, release and movement means being positioned in a latch housing located exterior of and substantially immediately adjacent to said valve housing and said induction manifold, said latch housing having a generally cylindrical cross-sectional configuration with a diameter generally approximating the width of said shutdown device between its upstream and downstream faces, said gate lever passing through said latch housing, and said gate lever portion being aligned with said release, latching and movement means within said latch housing.

2. An engine shutdown device as in claim 1 wherein said movement means comprises a compression spring and a gate lever guide reciprocal within said latch housing, said gate lever guide being movable with said gate lever and said compression spring acting upon said gate lever guide in said open position.

3. An engine shutdown device as in claim 2 wherein said latching means comprises a detent mechanism between said gate lever guide and said latch housing when said gate valve is in said open position.

4. An engine shutdown device as in claim 3 wherein said detent mechanism comprises a ball movable between a first position engaging said gate lever guide and said latch housing to a second position within said gate lever guide and out of engagement with said latch housing and a rod detent engaging said ball in said first and second positions, said rod detent having a portion extending externally of said latch housing.

5. An engine shutdown device as in claim 4 wherein said rod detent moves said ball by moving longitudinally along the axis of said latch housing into a recess of said gate lever guide, said ball being movable within said gate lever guide.

6. An engine shutdown device as in claim 5 wherein said rod detent is controllable externally of said latch housing.

7. An engine shutdown device as in claim 6 wherein said rod detent is manually controlled.

8. An engine shutdown device as in claim 6 wherein said rod detent is operable by solenoid.

9. An engine shutdown device as in claim 5 wherein said release means comprises a piston movable by air pressure within said latch housing, said piston being operable under the influence of air pressure to move said rod detent out of said recess in said gate lever guide.

10. An engine shutdown device as in claim 9 wherein said release means further comprises a rod connected to said piston, said rod being attached to said piston and extending along the axis of said latch housing and said gate lever guide, said rod being operable by the movement of said piston to move said rod detent out of said recess in said gate lever guide.

11. An engine shutdown device as in claim 2 wherein said gate lever guide is a piston operable by air pressure to move said gate lever and said gate valve from said closed to said open position.

12. An engine shutdown device as in claim 11 wherein when said air pressure is terminated, said gate valve is movable from said open to said closed position by said movement means.

13. An engine shutdown device as in claim 3 and further comprising piston means operable by air pressure to move said gate lever guide, said gate lever and said gate valve from said closed to said open position.

14. An engine shutdown device as in claim 14 wherein a longitudinal rod extends along the axis of said latch housing through said gate lever guide and is operatively connected to said piston means, said longitudinal rod being operable to release said restraining means when said piston means moves said gate valve from said closed to said open position.

15. An engine shutdown device as in claim 14 wherein said restraining means is a detent mechanism, said detent mechanism comprising a ball movable between a first position engaging said gate lever guide and said latch housing to a second position within said gate lever guide and out of engagement with said latch housing and a rod detent operable to move said ball between said first and second positions, said longitudinal rod operable to move said rod detent and allow said ball from said first to said second positions.

16. An engine shutdown device adapted to be inserted in the induction manifold of an engine and comprising a substantially circular gate valve movable within a valve housing about an axis between open and closed positions, a gate lever between said gate valve and said axis, latching means to hold said valve and lever in said open position, release means to release said latching means, and movement means comprising a gate lever guide and a compression spring acting on a portion of said gate lever to move said valve and lever between said open and said closed positions, said latching, release and movement means being positioned in a cylindrically shaped latch housing located exterior of said valve housing and said induction manifold, said gate lever passing through said latch housing, said gate lever portion being aligned with said release, latching and movement means within said latch housing and, said axis being located adjacent said latch housing.

17. An engine shutdown device comprising a substantially circular gate valve movable within a valve housing about an axis between open and closed positions, a gate lever between said gate valve and said axis, latching means to hold said valve and lever in said open position, release means to release said latching means and movement means to move said valve and lever between said open and said closed positions, said latching, release and movement means being positioned in a latch housing located exterior of and substantially immediately adjacent to said valve housing and said induction manifold, said gate lever passing through said latch housing from said axis located adjacent said latch housing to said gate valve, said latch housing having a generally cylindrical cross-sectional configuration with a diameter generally approximating the width of said shutdown device between its upstream and downstream faces, said latching means comprising a detent mechanism between said gate lever guide and said latch housing comprising a ball movable between a first position engaging said gate lever guide and said latch housing to a second position within said gate lever guide and out of engagement with said latch housing, a rod detent engaging said ball in said first and second positions, said rod detent having a portion extending externally of said latch housing, said movement means comprising compression spring means and a gate lever guide reciprocal within said latch housing, said gate lever guide being movable with said gate lever, said compression spring means acting upon said gate lever guide when said gate lever guide is in said open position.

18. An engine shutdown device as in claim 17 wherein said rod detent moves said ball by moving longitudinally along the axis of said latch housing into a recess of said gate lever guide, said ball being movable within said gate lever guide.

19. An engine shutdown device as in claim 18 wherein said rod detent is controllable externally of said latch housing.

20. An engine shutdown device as in claim 19 wherein said rod detent is manually controlled.

* * * * *

UNITED STATES PATENT AND TRADEMARK OFFICE
CERTIFICATE OF CORRECTION

PATENT NO. : 4,537,386
DATED : August 27, 1985
INVENTOR(S) : KREPELA et al

It is certified that error appears in the above-identified patent and that said Letters Patent is hereby corrected as shown below:

Column 6, line 24, change "An engine shutdown device as in claim 14" to -- An engine shutdown device as in claim 13 --.

Signed and Sealed this

Fifth Day of January, 1988

Attest:

DONALD J. QUIGG

*Attesting Officer*   *Commissioner of Patents and Trademarks*